United States Patent [19]
Politte

[11] 3,903,040
[45] Sept. 2, 1975

[54] PREPARATION OF POLYMER-IN-POLYMERIZABLE MONOMER SOLUTION

[75] Inventor: Leo L. Politte, Bartlesville, Okla.

[73] Assignee: Phillips Petroleum Company, Bartlesville, Okla.

[22] Filed: July 30, 1973

[21] Appl. No.: 383,728

[52] U.S. Cl......... 260/33.6 A; 260/34.2; 260/880 R
[51] Int. Cl. ......................... C08c 11/22; C08f 19/08
[58] Field of Search........... 260/33.6 A, 34.2, 880 R

[56] References Cited
UNITED STATES PATENTS

| | | | |
|---|---|---|---|
| 3,076,795 | 2/1963 | Hall | 260/94.7 |
| 3,084,134 | 2/1963 | Bailey | 260/29.7 |
| 3,244,660 | 4/1966 | Herold | 260/34.2 |
| 3,264,375 | 8/1966 | Jones | 260/880 B |
| 3,280,091 | 10/1966 | Dance | 260/93.7 |
| 3,549,726 | 12/1970 | Hanzl | 260/880 R |
| 3,551,522 | 12/1970 | Miles et al. | 260/878 |

Primary Examiner—Donald E. Czaja
Assistant Examiner—H. H. Fletcher

[57] ABSTRACT

A polymer in non-polymerizable solvent solution is mixed with a polymerizable monomer; fractionated using additional polymerizable monomer vapor as stripping vapor; non-polymerizable solvent is removed as overhead product; polymer-in-polymerizable monomer solution is removed as kettle product.

10 Claims, 1 Drawing Figure

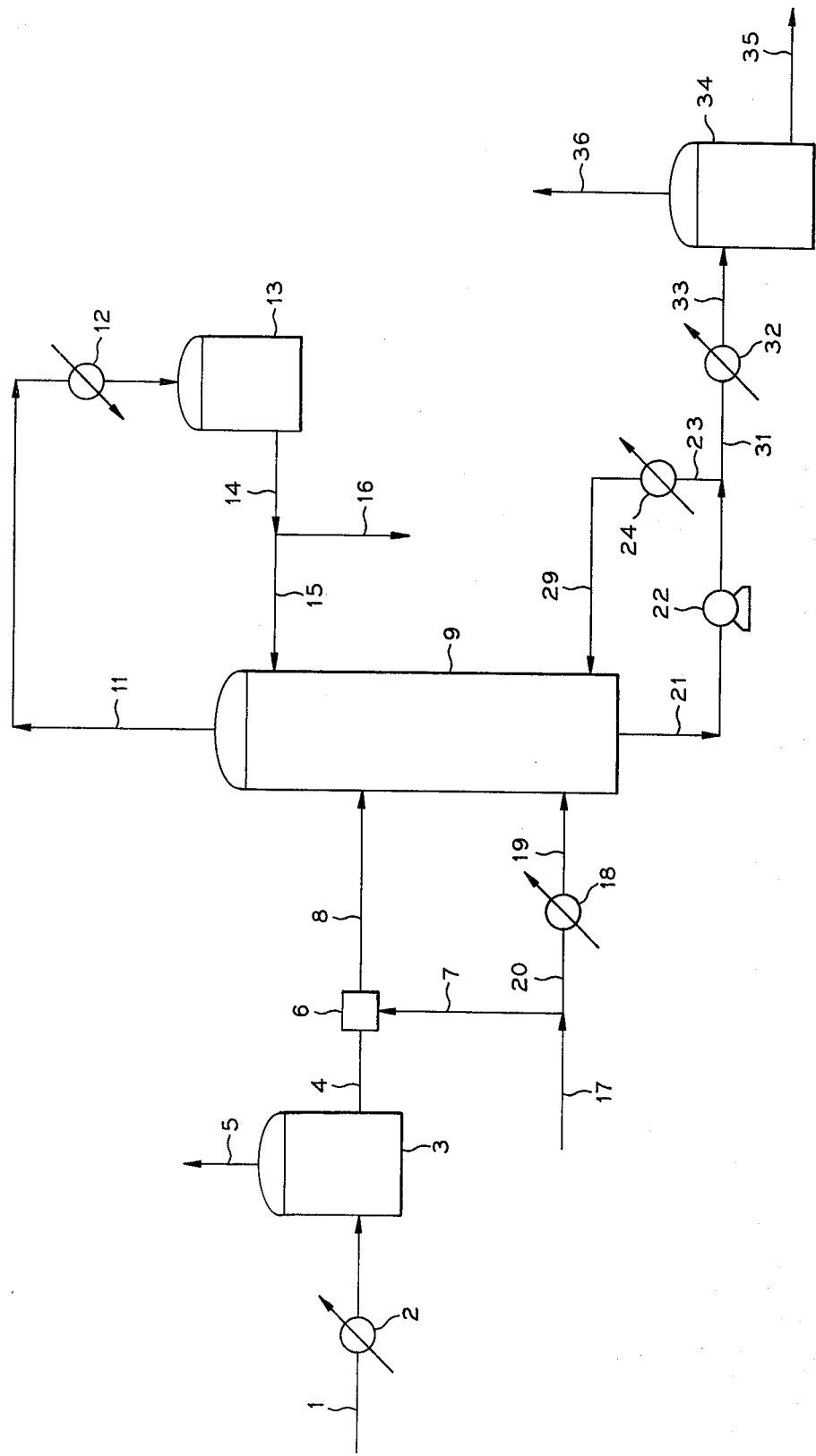

3,903,040

PREPARATION OF POLYMER-IN-POLYMERIZABLE MONOMER SOLUTION

BACKGROUND OF THE INVENTION

The invention relates to an improved process for producing a polymer-in-polymerizable monomer solution.

In the manufacture of certain plastics and other copolymers, as for an example a high impact type plastic, polymers such as polybutadiene are dispersed in a rigid polymer, such as polystyrene, to give the brittle and hard styrene homopolymer elastic or high impact characteristics. The polymer is usually produced in non-polymerizable solvent such as hexane, cyclohexane and the like. It has proven desirable to substitute polymerizable monomer for the non-polymerizable process solvent which is used as a solvent for the polymer during manufacture. This substitution eliminates the steps of separating the polymer from the solvent, drying, crumbing, baling, packing, unpacking, shredding and dissolving the rubber in the polymerizable monomer. As an example, styrene is substituted for hexane or cyclohexane solvent used in the manufacture of polybutadiene to produce a polybutadiene-in-styrene solution. The styrene is subsequently polymerized and some of it grafted onto the butadiene polymer producing a styrene-butadiene copolymer. In this and other such solvent substitutions a number of problems have arisen. For example, where the polymer, non-polymerizable solvent and the polymerizable monomer are mixed together and fractionated, problems have arisen due to polymerization in the fractionator. Polymer thus produced causes fouling of fractionator internals, especially reboiler heat transfer surfaces. Since the amount of polymer formed in the fractionator is unknown, it is difficult to control the properties of the final product. In addition, a kettle product of the desired concentration is frequently too viscous to handle easily, which causes problems in the fractionator and reboiler. Also some non-polymerizable solvents tend to freeze when being recovered in a state of high purity as overhead product from the fractionator.

It is an object of the invention to prepare a polymer-in-polymerizable monomer solution.

Another object of the invention is to minimize polymerization during the fractionating step.

Still another object of the invention is to prevent the non-polymerizable solvents from freezing when being removed as the fractionator overhead.

Yet another object of the invention is to reduce the viscosity of said polymer-in-polymerizable monomer kettle product in the fractionator.

SUMMARY OF THE INVENTION

My invention is an improvement in the process of producing a polymer-in-polymerizable monomer wherein a polymer-in-non-polymerizable solvent solution is mixed with polymerizable monomer and the resulting mixture fed to a fractionator; said mixture is fractionated using vapor of the polymerizable monomer as a stripping agent; the non-polymerizable solvent removed overhead; and polymer-in-polymerizable monomer removed as kettle product.

DETAILED DESCRIPTION OF THE INVENTION

In accordance with the attached drawing illustrating the process of the invention, a solution of a polymer and a non-polymerizable solvent in line 1 is heated in heater 2, if necessary, to promote flashing before the solution is flashed in flashing means 3. The vaporized non-polymerizable solvent is removed from the flashing means 3 via line 5 with the remaining liquid in flashing means 3 being a concentrated polymer-in-non-polymerizable solvent solution and removed via line 4. The concentrated solution via line 4 is admixed in mixer 6 with polymerizable monomer in lines 17 and 7 with resulting mixture fed to fractionator 9 via 8. The mixing means 6 can be any suitable mixer, such as an inline orifice or nozzle etc. The overhead product in line 11 from the fractionator 9 is condensed in condensing means 12 and collected in accumulator 13. The condensed overhead product in line 14 from accumulator 13 is split via lines 15 and 16. Reflux sufficient for fractionation is provided via 15 and excess overhead condensate is carried via 16 to storage or recycled to the polymer polymerization process.

Polymerizable monomer, lines 17 and 20, is vaporized in heater 18 then fed via line 19 to the lower portion of fractionator 9. The vaporized polymerizable monomer is used as a stripping agent in the fractionator.

The kettle product consisting of a polymer-in-polymerizable monomer solution plus a small amount of non-polymerizable solvent is withdrawn from fractionator 9 via line 21 by a suitable means such as pump 22. A portion of the kettle product can be heated by a heating means 24 via line 23 and passed to the lower portion of fractionator 9 via line 29 providing additional heat to fractionator 9 if required. The kettle product not recirculated to fractionator 9 is passed to a heating means 32 via line 31 and on to flash tank 34 via line 33. Flash tank 34 is designed to remove the last traces of non-polymerizable solvent as well as to concentrate the kettle product. The vapor 36 from flash tank 34 composed of the polymerizable monomer with traces of the non-polymerizable solvent is removed and recycled for use with fresh polymerizable monomer line 17. The polymer-in-polymerizable monomer solution in the desired concentration is withdrawn from flash tank 34 via line 35 and further processed as required.

In the practice of the method of this invention often it is desirable to flash the polymer-in-non-polymerizable solvent solution to concentrate the solution to remove as much non-polymerizable solvent as possible prior to fractionation without the concentrated solution becoming too viscous to be removed from the flashing means and easily mixed with the polymerizable monomer in the mixing means. This "pre-flash" prior to mixing with polymerizable monomer results in a reduction of the vapor load in the rectifying section of the fractionator. Usually the amount of non-polymerizable solvent flashed off in flashing means 3 will range from 10 to 50 weight percent of the incoming feed solution. The amount of polymerizable monomer mixed with the concentrated polymer-in-non-polymerizable solvent solution is the amount necessary to give the resulting mixture a viscosity which will allow separation by fractionation.

Viscosity of the feed is the key factor in determining the minimum amount of polymerizable monomer to be mixed with the polymer solution in mixer 6. In addition the concentration of polymer desired in the kettle product may require that more than the minimum of polymerizable monomer as determined above be used. Once the concentration of polymer in the kettle product is determined, and frequently the viscosity of the kettle product dictates the maximum concentration of polymer allowable in the kettle product, then heat and material balances on the fractionator can be used to determine the quantity of polymerizable monomer for both feed (line 7) and stripping vapor (line 19) streams.

One of the more severe problems encountered in the fractionation of a mixture of polymer, non-polymerizable solvent and polymerizable monomer solvent arises because of the tendency of the polymerizable monomer to thermally polymerize, especially with increasing temperature. Although it is possible to form both a copolymer and a homopolymer through thermal polymerization in the fractionator, most of the polymer formed is the homopolymer type. Often the polymer formed from the monomer solvent collects on the fractionator bubble trays, downcomers, reboiler tubes etc., causing reduced operating efficiencies with subsequent costly shutdown and cleaning. Also the homopolymer of the monomer solvent formed in the fractionator is carried along with the kettle product ultimately ending up as an impurity in the final product when the polymer-in-polymerizable monomer solution is polymerized. Thus, if the amount of solvent polymerized in the fractionator can be minimized a better product can be produced.

Where part of the kettle product is circulated through a conventional reboiler to provide the heat required for fractionation, more polymerization occurs in the fractionator than if the stripping vapor technique is used to satisfy the fractionator heat load. The reason polymerization the fractionator can be reduced if stripping vapor is fed to the fractionator lies in fact that the viscosity of essentially pure polymerizable monomer liquid is significantly less than a solution of polymer dissolved in the same monomer. In reboiling a viscous fluid, localized overheating or "hotspots" are common and a substantial portion of the polymerization that takes place during fractionation is attributed to the polymerizable monomer solvent being subjected to relatively high temperatures associated with "hotspots" in the reboiler. Thus, by heating the monomer solvent and feeding it to the fractionator as stripping vapor the reboiling of a relatively viscous kettle product can be eliminated in most cases and the formation of polymer in the fractionator substantially reduced.

It is desirable to provide all of the heat required for fractionation by using polymerizable monomer stripping vapor to reduce the production of polymer in the fractionator as much as possible. But to insure sufficient heat is available for fractionation without excessively diluting the kettle product with additional stripping polymerizable monomer, it is suggested that a reboiler system be incorporated into the process to provide at least 20 percent of the heat required for fractionation.

In addition, to reduce the overall operating temperature of the fractionator and thus reduce the tendency of the polymerizable monomer to polymerize in the fractionator, the fractionator is frequently operated at a pressure of less than 14.7 psia, preferably at approximately 0.1 to 1.5 psia.

In the practice of the present invention the kettle product from the fractionator is fed to a flash tank where the kettle product is concentrated to the desired degree by flashing off polymerizable monomer. If the kettle product is concentrated too much in the fractionator the viscous solution could cause problems by plugging up the bubble trays, downcomers, reboilers, level controls etc.; consequently, a kettle product must be sufficiently dilute to allow the fractionator to operate properly. It is recommended that where a more viscous product is desired this "post flash" technique be used to concentrate the kettle product. In addition, this "post flash" serves to remove most all traces of non-polymerizable solvent remaining in the kettle product. It is important to remove as much non-polymerizable solvent as possible since it is usually quite volatile and undesirable to have such volatile materials in the copolymer which is subsequently formed from the kettle product. Frequently, polymers are required to have no more than a fraction of 1 percent non-polymerizable solvent remaining in the polymer after it is recovered from the solvent, dried, crumbed and baled. For example a typical specification for polybutadiene is three tenths of one percent of a solvent such as normal hexane in the polymer.

As used herein, the term polymer is any polymer with which it is desired to graft or polymerize at least one dissimilar monomer with said polymer and where said polymer is produced in a non-polymerizable solvent. Non-limiting examples of such polymers include polybutadiene, polyethylene, polypropylene, polybutene, polypentene and polyisoprene. In addition it is also within the scope of this invention that a copolymer such as acrylonitrilebutadiene can be used as the polymer and a polymer-in-polymerizable monomer solution produced through the practice of the present invention can be a solution such as acrylonitrile-butadiene-in-styrene monomer.

As used herein, a non-polymerizable solvent means a solvent which dissolves the polymer as defined above and which will not polymerize or react with itself or other components used in the process under the process conditions. Non-limiting examples of typical groups of non-polymerizable solvents are alkanes, cycloalkanes, aromatic hydrocarbons and mixtures thereof.

As used herein, the term polymerizable monomer means any monomer which is dissimilar to the polymer with which it is to be polymerized with. One important limitation on the polymerizable monomer is that it must be amenable to separation from the non-polymerizable solvent by fractionation. That is, the polymerizable monomer must have a boiling point sufficiently above that of the non-polymerizable solvent to promote separation by fractionation wherein the non-polymerizable solvent is removed as the overhead product and the polymer dissolved in the polymerizable monomer is removed as the kettle product. Non-limiting examples of typical polymerizable monomers include styrene, acrylic acid, methacrylic acid, and acrylonitrile. It is noted that where a particular polymer-in-polymerizable monomer solution is desired and the boiling point of the polymerizable monomer is too close to that of the non-polymerizable solvent, it still is possible to practice the invention if it is feasible to choose a different non-polymerizable solvent with a lower boiling point for use during the polymerization process of the polymer. Thus the boiling point limitation can be met by changing the non-polymerizable solvent rather than the polymerizable monomer.

In one calculated (as opposed to actual) illustrative embodiment of the present invention, a polybutadiene-in-normal hexane solution is used as the polymer-in-non-polymerizable solvent solution and the polymerizable monomer solvent is styrene. Cyclohexane can be used as the non-polymerizable solvent in place of normal hexane; however, if pure cyclohexane is used, its freezing point and boiling point are so close when using vacuum fractionation that the cyclohexane overhead will freeze if the overhead condenser is not operated within a very narrow temperature range. Therefore, if cyclohexane is used as the non-polymerizable solvent, it is suggested that the cyclohexane be mixed with normal hexane to produce an 85 weight percent cyclohexane mixture, preferably 60 percent cyclohexane, to provide a greater operating temperature range between the condensing temperature of the overhead stream and its freezing point.

Suggested operating conditions for such a polybutadiene-in-normal hexane embodiment are shown in Table 1.

TABLE I

| Location | °F | PSIA | Concentration of Polybutadiene |
|---|---|---|---|
| Butadiene-in-hexane Line 1 | 100 | 50–100 | 10–25 wt % |
| Heater 2 | 100–400 | 50–100 | 10–25 wt % |
| Flash tank 3 | 50–200 | 5–15 | 25–40 wt % |
| Concentrated butadiene-in-hexane Line 4 | 50–200 | 5–15 | 25–40 wt % |
| Fractionator feed line 8 | 100–200 | 5–15 | 5–15 wt % |
| Heater 18 | 130–150 | 0.1–1.5 | 0 |
| Overhead condenser 12 | 20–40 | 0.1–1.5 | 0 |
| Fractionator reboiler 24 | 130–170 | 0.1–1.5 | 5–15 wt % |
| Kettle product line 21 | 130–170 | 0.1–1.5 | 5–15 wt % |
| Flash tank 34 | 130–170 | 0.1–1.5 | 10–25 wt % |
| Heater 32 | 130–170 | 0.1–25 | 5–15 wt % |
| Polymer-Styrene Solution (35) | 100–150 | 0.1–1.5 | 10–25 wt % |

The material balance shown in Table II below has been calculated for a polybutadiene-in-normal hexane embodiment of the present invention. Included in the material balance are olefinic impurities and a non-volatile antioxidant normally carried over from the polymerization of butadiene and the theoretical results shown in Table II are believed to be representative of results to be obtained when such a run is performed.

TABLE II

| Component | Polymer/ NC₆ Solution Feed | Dry Dilution Styrene | Concentrated Polymer-NC₆ Solution | Recycle from Pre-flash Tank | Styrene Stripping Vapor | Fractionator Feed | Overhead Product Recycle to Polymer Plant | Kettle Product | Flashed Styrene Vapor | Concentrate Polymer Styrene Solution |
|---|---|---|---|---|---|---|---|---|---|---|
| No. on Dwg. | 1 | 7 | 4 | 5 | 19 | 8 | 16 | 21 | 36 | 35 |
| Impurities | 1,424 | 0 | 187 | 1,237 | 0 | 187 | 187 | 0 | 0 | 0 |
| Polybutadiene Polymer | 139,786 | 0 | 139,785 | 1 | 0 | 139,785 | 0 | 139,785 | 0 | 139,785 |
| Antioxidant | 0 | 0 | 140 | 0 | 0 | 140 | 0 | 140 | 0 | 140 |
| NC₆ | 787,508 | 260 | 322,073 | 465,435 | 170 | 322,333 | 321,903 | 430 | 430 | 0 |
| Styrene | 0 | 1,516,148 | 0 | 0 | 1,000,000 | 1,516,148 | 700 | 2,515,448 | 1,257,523 | 1,257,925 |
| Total lb/day | 928,858 | 1,516,408 | 462,186 | 466,673 | 1,000,170 | 1,978,593 | 322,790 | 2,655,803 | 1,257,953 | 1,397,850 |
| Wt. % Polymer | 15.0 | 0 | 30.0 | 0 | 0 | 7.0 | 0 | 5.6 | 0 | 10.0 |

The above calculated illustrative embodiment serves to assist in understanding the process of the invention and the specific components, temperatures, pressures, and the like are not to be limitations on the reasonable and proper scope of the invention.

It is understood that natural rubber (cis,1,4-polyisoprene) can be used as the polymer in the present invention; however, since natural rubber is not normally found in solution and particularly in a solution with a non-polymerizable solvent, it is unlikely natural rubber would be used. This invention does not relate to the method of the polymerization of the polymer, except to the extent that the solvent used in the polymerization step and therefore present during the steps of the invention influence the conditions of the process. Thus it is unnecessary to describe the details of solution polymerization to form polymers in a non-polymerizable solution. It is equally unnecessary to describe in detail the initiators used in solution polymerization.

In addition, the process of producing copolymers from the kettle product is not a material part of the present invention, but points out the utility of the disclosure herein. Thus it is also unnecessary to describe in detail the copolymerization process.

What is claimed is:

1. A process for producing a solution in which a polymer is dissolved in a polymerizable monomer, said process comprising:

mixing a solution of a polymer dissolved in a non-polymerizable solvent with a polymerizable monomer wherein the amount of the polymerizable monomer is that necessary to give the resulting mixture a viscosity which will allow separation by fractionation and wherein the polymerizable monomer has a boiling point sufficiently above that of the non-polymerizable solvent to promote separation by fractionation;

feeding the resulting mixture to a fractionating zone;

feeding polymerizable monomer vapor to the stripping section of said fractionating zone, said vapor providing at least a substantial portion of stripping vapor required for fractionation;

removing the non-polymerizable solvent as fractionator overhead; and, removing a solution of the polymer dissolved in polymerizable monomer as fractionator kettle product.

2. The process of claim 1 wherein said solution of the polymer dissolved in the non-polymerizable solvent is heated and flash concentrated prior to mixing with said polymerizable monomer.

3. The process of claim 1 wherein said kettle product is flash concentrated subsequent to removal from said fractionating zone.

4. The process of claim 1 wherein said non-polymerizable solvent is an alkane, cycloalkane, aromatic hydrocarbon or mixtures thereof and the polymerizable monomer solvent is a monovinyl aromatic hydrocarbon.

5. The process of claim 4 wherein said monovinyl aromatic hydrocarbon is styrene.

6. The process of claim 5 wherein the polymer which is dissolved in a non-polymerizable solvent is polybutadiene.

7. The process of claim 6 wherein the non-polymerizable solvent is normal hexane.

8. The process of claim 6 wherein the non-polymerizable solvent is a mixture between 60 and 85 weight percent cyclohexane, balance normal hexane.

9. The process of claim 1 wherein a solution of polybutadiene-in-normal hexane in the range of 10 to 40 weight percent polybutadiene is mixed with styrene to form a mixture in the range of 5 to 15 weight percent polybutadiene;

said mixture is vacuum fractionated at a pressure in the range of 0.1 to 1.5 psia;

styrene is heated and fed to the stripping section of fractionating zone to provide at least a substantial portion of the heat required for fractionation;

normal hexane is recovered as fractionator overhead;

a solution of polybutadiene-in-styrene with a concentration in the range of 5 to 15 weight percent polybutadiene is recovered as fractionator kettle product; and said polybutadiene-in-styrene solution is heated and fed to a flashing zone where it is flash concentrated to a concentration in the range of 10 to 25 weight percent polybutadiene.

10. The process of claim 1 wherein said fractionating zone is operated at a pressure below 14.7 psia.

* * * * *